Dec. 28, 1926.
L. COSSOFF
1,611,891
BRAKING MECHANISM FOR AUTOMOBILES
Filed Feb. 28, 1925  2 Sheets-Sheet 1
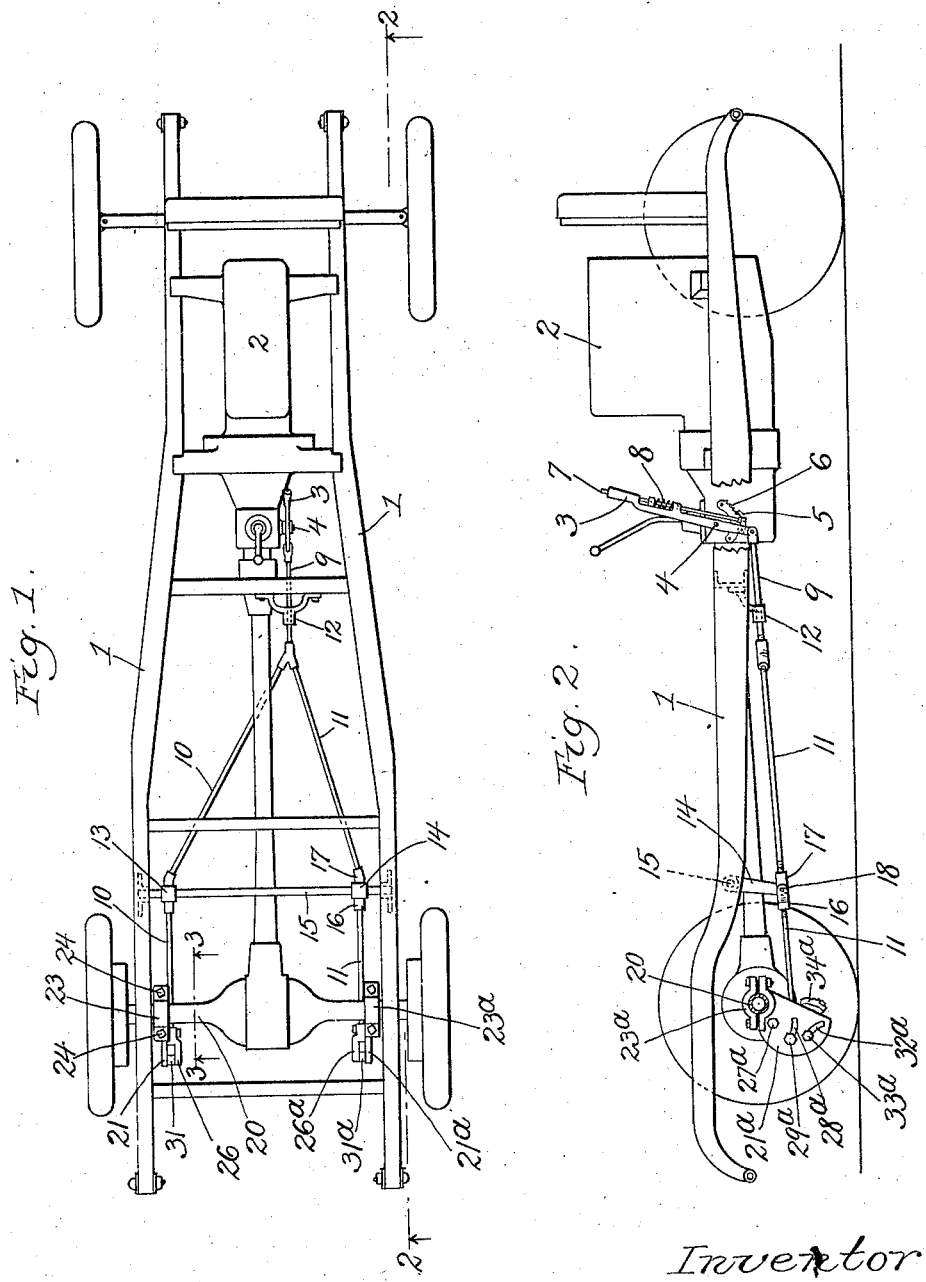
Inventor
Larry Cossoff
by Parker & Carter
Attorneys.

Dec. 28, 1926. 1,611,891
L. COSSOFF
BRAKING MECHANISM FOR AUTOMOBILES
Filed Feb. 28, 1925 2 Sheets-Sheet 2
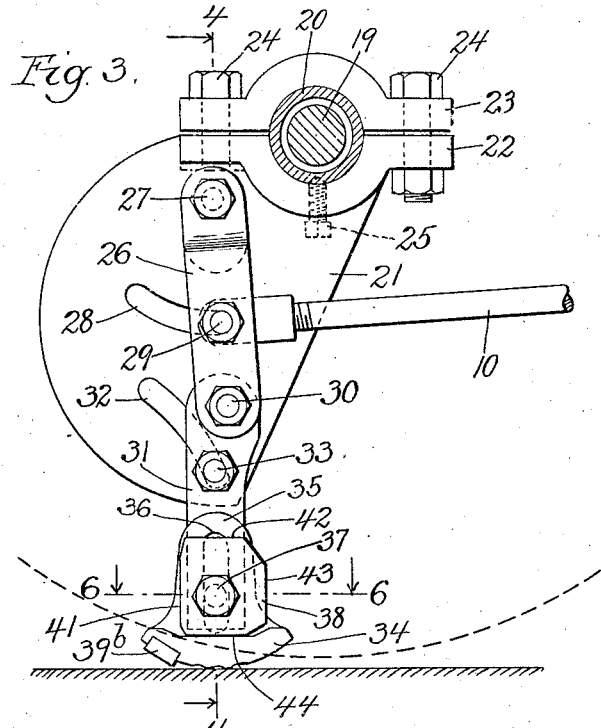
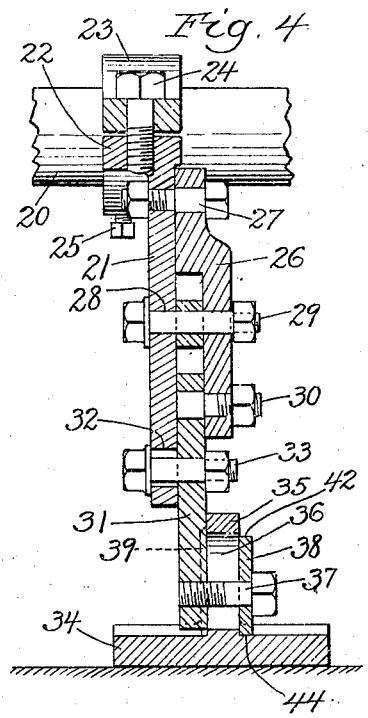
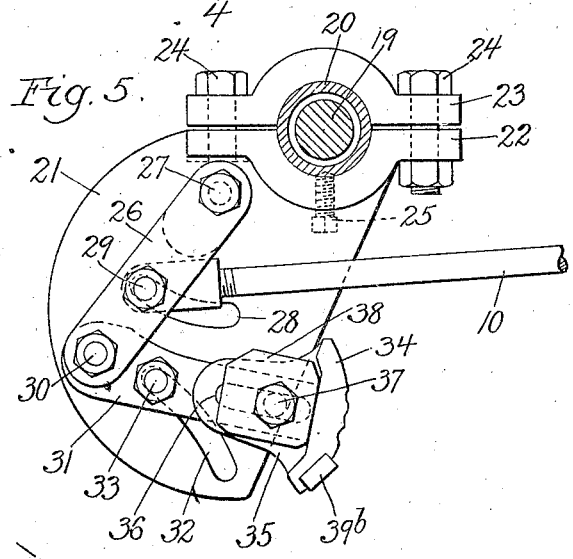
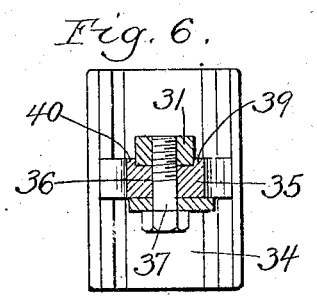
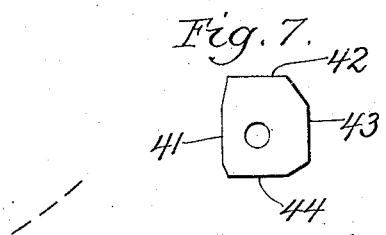
Inventor.
Larry Cossoff
by Parker & Carter
Attorneys.

Patented Dec. 28, 1926.

1,611,891

UNITED STATES PATENT OFFICE.

LARRY COSSOFF, OF CHICAGO, ILLINOIS.

BRAKING MECHANISM FOR AUTOMOBILES.

Application filed February 28, 1925. Serial No. 12,296.

This invention relates to braking mechanisms for automobiles, or other vehicles and has for its object to provide a new and improved device of this description.

The invention has as a further object to provide a braking mechanism which will act quickly and which will be effective to stop the machine in a short distance.

The invention has as a further object to provide a braking mechanism which will prevent skidding.

The invention has a further object to provide a braking mechanism which will eliminate the wear upon the tires when the machine is stopped.

The invention has other objects which are more particularly pointed out in the accompanying description.

Referring now to the drawings:

Fig. 1 is a plan view of an automobile chassis showing one form of the braking mechanism.

Fig. 2 is a sectional view on line 2—2 of Fig. 1 with parts broken away.

Fig. 3 is an enlarged sectional view on line 3—3 of Fig. 1 when the parts are in their operative position.

Fig. 4 is a sectional view taken on line 4—4 of Fig. 3.

Fig. 5 is a view similar to Fig. 3 with the parts in their inoperative position.

Fig. 6 is a sectional view taken on line 6—6 of Fig. 3.

Fig. 7 is a view of the adjusting plate.

Like numerals refer to like parts throughout the several figures.

The invention may be applied to any automobile or vehicle, and I have for purposes of illustration, shown it applied to one type of automobile having a frame or chassis 1 upon which is mounted the engine 2 which drives the rear axle through the usual mechanism. I have shown the braking mechanism as being controlled by the brake lever 3 which may be of the usual type pivoted at 4, and provided with a locking pawl 5 which locks the brake lever in any desired position by engaging the ratchet 6, the pawl being controlled by the spring pressed member 7.

When the brake lever is moved the member 7 is pressed down so as to release the pawl, and when the member 7 is released the spring 8 causes the pawl to engage the ratchet 6 and hold the lever in any desired position. Connected with the brake lever 3 is a controlling member 9 which is moved back and forth by the lever. This member 9 connects with the two members 10 and 11 by means of which the braking mechanism is operated. The member 9 preferably works in a guide 12. The members 10 and 11 are supported by the links 13 and 14 which are carried by the cross member 15. The links 13 and 14 are pivoted to the cross member 15.

The members 13 and 14 are pivotally connected with the members 10 and 11 and these members are preferably divided at the point of connection and pivoted together by the same pivot which connects them to the members 13 and 14. One form of this construction is illustrated in Fig. 2 where member 11 is shown as having the two pieces 16 and 17 which are pivoted together by the pivot 18 which pivots the link 14 thereto. The link 14 is free to move back and forth when the members 10 and 11 are reciprocated, and the pivoting of the parts 16 and 17 permits the proper up and down play due to the fact that the pivot 18 moves in the arc of a circle.

The controlling members 10 and 11 are connected with the brake members, there being one set of brake members on each side of the automobile, these brake members being similar. I have shown the device applied to an automobile where the rotating rear axle 19 is covered with a non-rotating sleeve 20. Fastened in any desired manner to this sleeve is a brake member 21. As herein shown, this attachment is made by means of the portions 22 and 23 which surround the sleeve and which clamp it by means of the bolts 24. I also prefer to provide a set screw 25 to prevent the clamping members from moving about the sleeve in the event they are not clamped tight enough.

Associated with the braking member 21 is a link 26 pivoted to the member 21 by the pivot 27. This link, preferably has an offset portion which provides a space between it and the member 21. The member 21 has a slot 28, and a bolt or pin 29, connected with the link 26, works in this slot when the link is moved about its pivot. The control member 10 is connected with the pin 29 so as to move the link 26 about its pivot when the brake lever 3 is moved. Pivoted to the link 26 by the pivot 30 is a brake shoe holding member 31. The brake member 21 has a second slot 32, and a pin 33 connected with the brake shoe holding member 31, works in this slot when the link 26 and the member 31 are moved. Connected with the brake shoe holding member 31 is a brake shoe 34. This shoe is preferably adjustably connected with the holding member 31 in any suitable manner.

As herein illustrated, the brake shoe has the projecting part 35 with a slot 36 therein. A threaded pin 37 works in a threaded opening in the shoe holding member 31 and passes through an adjustable plate 38 (see Figs. 3 and 4). This adjustable plate has flattened edges, and when in position one of the edges preferably engages the top surface of the brake shoe 34. The various edges of the adjustable plate 38 are of different distances from the hole through which the pin 37 passes, and hence to adjust the brake shoe it is only necessary to loosen the pin 37 and rotate the plate 38 so as to bring the proper edge against the shoe 34. With the plate shown in Fig. 3 the shoe will be projected the smallest amount when the face 41 at the left is against the brake shoe, and will be projected the greatest amount when the face 42 at the top is against the brake shoe. The brake shoe will be projected intermediate amounts when engaging the other faces 43 and 44 of this plate. The slot 38 may be of any length desired and different plates may be provided to get the desired extension of the brake shoe, depending, of course, upon the height of the axle above the ground. When the pin 37 is tightened the plate 38 clamps the projecting part 35 of the brake shoe against the holding member 31. The brake shoe may be roughened as shown, if desired, and I prefer to provide it with a non-metallic piece 39$^b$ which first engages the ground when the brake shoe is moved to its operative position. This non-metallic piece 39$^b$ assists in bringing the brake shoe to its full operative position and when the brake shoe is in its full operative position it is out of engagement with the pavement. The projecting part 35 on the brake shoe is preferably provided with projections 39 and 40 (see Fig. 6) between which the brake shoe holding member 31 fits, so as to prevent rotation of the shoe about the pin 37 when the shoe engages the ground. There are two sets of these brake members, the other set being actuated by the controlling member 11, being illustrated in Fig. 2, and I have applied the same letters to the other set except that I have used the exponents "a" in connection therewith.

I have described a particular device embodying the invention but it is, of course, evident that the parts may be varied in many particulars without departing from the spirit of the invention as embodied in the claims hereto attached, and I therefore do not limit myself to the particular construction shown.

The use and operation of my invention are as follows:

When the brake is not in use the parts are in the position illustrated in Fig. 5. When it is desired to use the brakes to stop the car, the top of the brake lever 3, Figs. 1 and 2, is moved to the left. This moves the controlling members 10 and 11 so as to apply the brakes.

I will explain the movement of the parts of one of the brakes and this will make the matter clear, as the other brake mechanism is similar.

Referring now to Figs. 3, 4 and 5, when the controlling member 10 is moved as above indicated, the link 26 is moved about its pivot 27, the pin 29 moving in the slot 28. This moves the braking supporting member 31, and the pin 33 working in the slot 32 carries the brake shoe down so that it engages the surface over which the machine is traveling and takes the position illustrated in Fig. 3, thereby lifting the rear wheels from the surface as indicated by the dotted line in Fig. 3.

The parts are arranged so that the link 26 and the shoe supporting member 31 are slightly out of alignment when in the full on position, the pivot 30 being slightly to one side of the center line is indicated in Fig. 3, thereby tending to lock the parts against accidental movement.

As the brake shoe 31 moves down the non-metallic part 39$^b$ strikes the surface first and the further movement of the parts brings them into the position shown in Fig. 3. When it is desired to release the brakes, the top of the brake lever 3 is moved in the opposite direction; namely to the right, and the parts are then moved back to their inoperative position as shown in Fig. 3.

It will be seen that by means of this mechanism the wear due to stopping is entirely removed from the tires as the wheels are lifted from the ground. This construction also prevents the skidding of the machine and may be applied for this purpose whenever there is a tendency to skid.

This device my be used in connection with any of the ordinary brakes or it may be used alone as desired.

This device may be called a safety device because it puts the automobile so fully under the control of the operator as to permit him to avoid accidents, both by his ability to quickly stop the automobile, and to prevent skidding thereof.

It will be noted that when the brake shoe is in its operative position the slot 32 is so arranged that the pin 33 engages the edge of the slot and prevents the brake shoe from moving rearwardly. This construction therefore takes the strain on the brake shoe and relieves the actuating mechanism from such strain. The only work the actuating mechanism is required to do is to move the brake shoe to its operative position or to its inoperative position.

I claim:

1. A braking mechanism for vehicles comprising a brake member mounted upon the vehicle provided with a slot, a link pivotally connected with said brake member, a pin engaging said link and working in said slot, a controlling member connected with said link, a brake supporting member pivotally connected with said link, a pin connected therewith, a second slot in said brake member in which said pin works, and a brake shoe with said brake supporting member.

2. A braking mechanism for vehicles comprising a brake member mounted upon the vehicle provided with a slot, a link pivotally connected with said brake member, a pin engaging said link and working in said slot, a controlling member connected with said link, a brake supporting member pivotally connected with said link, a pin connected therewith, a second slot in said brake member in which said pin works, and a brake shoe with said brake supporting member adapted to be brought into contact with the surface over which the vehicle travels when the controlling member is actuated.

3. A braking mechanism for vehicles comprising a brake member mounted upon the vehicle provided with a slot, a link pivotally connected with said brake member, a pin engaging said link and working in said slot, a controlling member connected with said link, a brake supporting member pivotally connected with said link, a pin connected therewith, a second slot in said brake member in which said pin works, a brake shoe with said brake supporting member adapted to be brought into contact with the surface over which the vehicle travels when the controlling member is actuated, and means for adjusting said brake with relation to said brake supporting member.

4. A braking mechanism for vehicles comprising a brake shoe, a brake supporting member with which it is connected, a link pivotally connected with said brake supporting member, said link and brake supporting member normally at an angle to each other when in their inoperative position, actuating mechanism for moving said link and said brake supporting member in substantial alignment to bring said brake shoe into contact with the surface over which the vehicle is travelling and means depending from the rear axle of the vehicle for resisting the backward movement of the shoe due to the movement of the vehicle when the brake is in its operative position.

5. A braking mechanism for vehicles comprising a brake member attached to the vehicle, two movable members connected with said brake member, a brake shoe having a projection thereon with a slot therethrough, a pin connected with one of said members and passing through said slot, a plate through which said pin passes, said plate having a series of edges at varying distances from the center of said pin, one of the edges of the plate when in position engaging said shoe, said plate adapted to be moved to bring any of its said edges in contact with the shoe so as to hold the shoe in various positions.

6. A braking mechanism for vehicles comprising a brake member attached to the vehicle, two movable members connected with said brake member, a brake shoe having a projection thereon with a slot therethrough, a pin connected with one of said members and passing through said slot, a plate through which said pin passes, said plate having a series of edges at varying distances from the center of said pin, one of the edges of the plate when in position engaging said shoe, said plate adapted to be moved to bring any of its said edges in contact with the shoe so as to hold the shoe in various positions, and means for preventing rotation of said shoe with relation to the member with which it is connected.

7. A braking mechanism comprising a shoe mounted upon the vehicle, an actuating mechanism for moving said shoe into contact with the surface over which the vehicle is travelling, and a controlling device for said actuating mechanism within the reach of the driver, said shoe provided with a non-metallic piece connected with the rear portion thereof so as to be the first part of the shoe to engage the surface as the shoe moves to its operative position, said non-metallic piece being moved out of operative engagement with said surface when the shoe reaches its full operative position.

8. A braking mechanism for vehicles comprising a brake member having a flat surface, means for connecting said brake member with the axle of the vehicle, two movable members pivoted together, one of them being pivotally connected with the brake member, a brake shoe connected with the other member, pins connected with both of said members, said brake member having diverging slots in which said pins work, and means for moving said members so as to straighten them and bring the brake shoe into contact with the surface over which the vehicle is travelling.

Signed at Chicago, county of Cook and State of Illinois, this 17th day of February, 1925.

LARRY COSSOFF.